Feb. 16, 1954         H. S. HILTON         2,669,416
FABRICATED VALVE WITH REMOVABLE SELF-CLEANING SEAT
Filed April 11, 1950                                           2 Sheets—Sheet 2
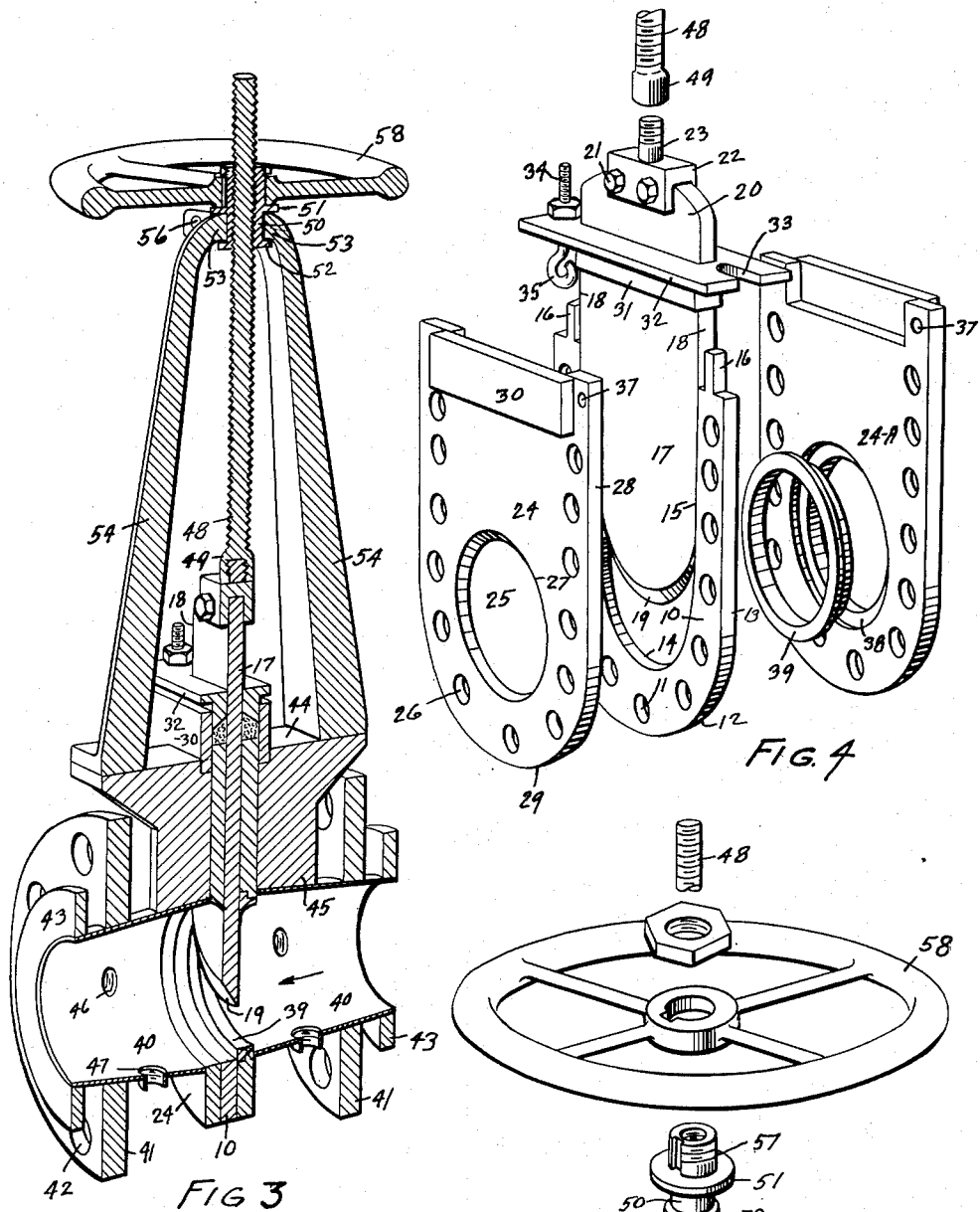
INVENTOR.
BY    HAROLD S. HILTON
ATTORNEY Patented Feb. 16, 1954

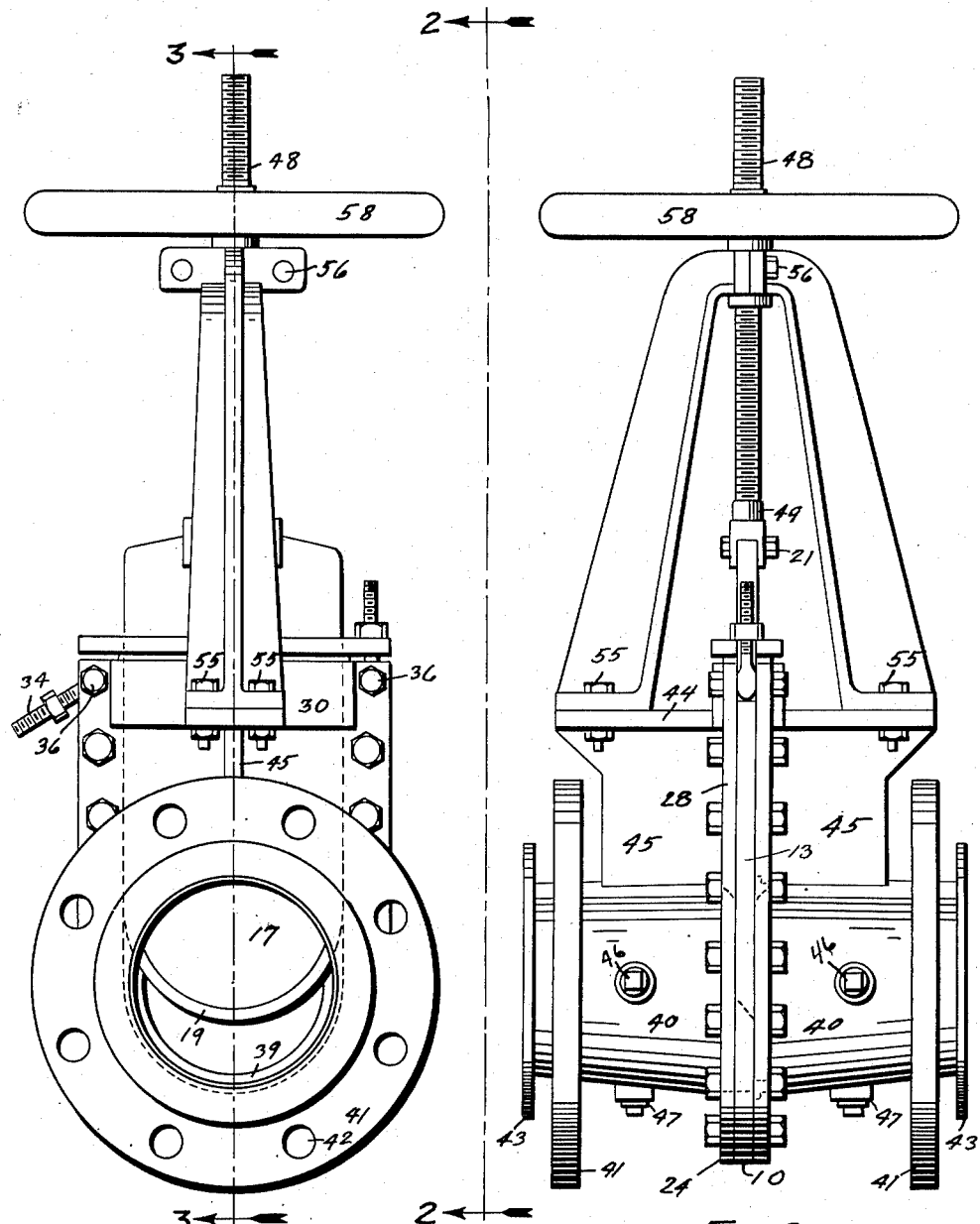

2,669,416

UNITED STATES PATENT OFFICE 2,669,416

FABRICATED VALVE WITH REMOVABLE SELF-CLEANING SEAT

Harold S. Hilton, Portland, Oreg., assignor to Fabri-Valve Company of America, Portland, Oreg.

Application April 11, 1950, Serial No. 155,258

2 Claims. (Cl. 251—51)

This invention relates generally to valves such as are used for controlling the flow of stock and particularly to fabricated steel valves having removable self-cleaning seats.

The main object of this invention is to provide a stock valve which will be light in weight and which will have a removable metal seat making it possible to replace it if it should become injured and to do so without shutting down the plant for an objectionably long time.

The second object is to construct a valve having a smooth opening and closing action by forcing the stock to slide toward tangents of the blade and body thereby producing a slicing effect.

These and other objects are accomplished in the manner set forth in the annexed specification as illustrated in the accompanying drawings, in which:

Fig. 1 is an end view of the valve.

Fig. 2 is a side elevation taken along the line 2—2 in Fig. 1.

Fig. 3 is a perspective sectional view taken along the line 3—3 in Fig. 1.

Fig. 4 is a perspective view with the main parts in spaced relationship.

Fig. 5 is a perspective view of the hand wheel and its associated screw and nut, all in spaced relationship and with part of the screw broken away.

Like numbers of reference refer to the same or similar parts throughout the several views.

Referring in detail to the drawings, there is shown a U-shaped gate guide spacer 10 having bolt holes 11 formed along its rounded side 12 and its parallel sides 13. The rounded bottom 14 is tangent to the parallel inner sides 15 of the spacer 10.

The upper ends of the spacer 10 are provided with the upturned tongues 16 which are spaced from the inner side 15 and the outer side 13.

Within the spacer 10 is slidably mounted the gate 17 whose parallel sides 18 engage the spacer sides 15 while its beveled end 19 is rounded to conform to the curve of the spacer bottom 14.

The upper end 20 of the gate 17 has secured thereto, by means of the bolts 21, a clip 22 having a threaded shank 23.

Against the discharge side of the spacer 10 is placed the valve body plate 24 having a circular opening 25 formed therein and bolt holes 26 which register with the holes 11.

The upper portion 27 of the opening 25 is beveled as shown.

The edges 28 of the valve body 24 and the rounded end 29 conform to the spacer sides 12 and 13. The top of the plate 24 is cut away a distance equal to the space between the adjacent faces of the tongues 16. A bar 30 is secured over the cut away portion forming a space around the gate 18 into which projects the gland 31 whose flange 32 is provided with end slots 33, through which extend the eye bolts 34 whose eyes 35 receive the bolt 36 which passes through the hole 37 in the two body plates 24 and 24-A.

The valve body plate 24-A is identical with the plate 24 except that it is provided with a counter-bored recess 38 into which is inserted a valve seat 39 of suitable metal such as stainless steel. When the seat 39 is in place, it is flush with the face of the body 24-A.

Secured to each body 24 and 24-A is a tapering valve shell 40 whose larger ends are secured to the members 24 and 24-A around the openings 25 and 38.

On the outside of the shells 40 are slidably placed the clamping flanges 41 provided with bolt holes 42.

Smaller flanges 43 are rigidly secured on the ends of the shells 40 outside of the flanges 41 and the flanges 43 are held against a gasket (not shown) by pressure exerted on the flanges 41 by bolts which occupy the holes 42.

It will be noted that the knife edge 19 shears across the face of the valve seat 39 and that no fibers or solid matter can accumulate there as it must cascade over the seat 39 onto the lower surface 14 where it is continually flushed away as long as stock is passing through the valve.

In this valve a top plate 44 is joined by a web 45 to the top of the shell 40. Each shell 40 is provided with drain plugs 46 and 47 for releasing pressure on the line or draining or flushing some section of the line.

Motion is supplied to the gate 17 by a screw 48 whose end 49 is threaded onto the shank 23. The screw 48 passes through a nut 50 having a central exterior flange 51 and a lower flange 52 formed thereon. The nut 50 journals in the half bearings 53 formed on the upper ends of the standards 54 which are secured to the plate 44 by the bolts 55. Bolts 56 unite the half bearings 53.

Keyed on the upper end 57 of the nut 50 is a hand wheel 58 which is held down by the nut 59.

What is claimed as new is:

1. A fabricated stock valve comprising a U-shaped gate guide spacer having upturned tongues on its open ends, a pair of valve body plates disposed against the opposite sides of said spacer and having a valve opening therein registering with the opening in the closed end of said U-shaped member and exceeding same in radius, said plates having closed portions forming cover plates across the open ends of said spacer, the closed end of said body plates having cut-out portions extending between the adjacent faces of said upturned tongues, bars forming covers for said cut-out portions, a rectangular gland disposed between said bars and upturned tongues, a gate slidably occupying said gland having one rounded end, the edge of which is chisel shaped, tapering shells having their larger ends welded to said valve body members around the openings therein, a clamping flange slidably mounted on each of said shells, a smaller flange secured on the outer end of each shell and means for moving said gate between the sides of said U-shaped member.

2. The valve as described in claim 1 having its gland provided with a flange around its outer end, the ends of said flange having slots formed therein, an eye bolt hinged between said body plates extending through said slots and having a nut thereon on the outer side of the slotted portion of said gland flange.

HAROLD S. HILTON.

References Cited in the file of this patent

UNITED STATES PATENTS

| Number | Name | Date |
|---|---|---|
| Re. 6,922 | Chapman | Feb. 15, 1876 |
| 736,513 | Fowler | Aug. 18, 1903 |
| 1,801,237 | Hanson | Apr. 14, 1931 |
| 2,000,494 | Nordstrom | May 7, 1935 |
| 2,001,271 | Smith | May 14, 1935 |
| 2,064,567 | Riley | Dec. 15, 1936 |
| 2,448,706 | Edwards | Sept. 7, 1948 |

FOREIGN PATENTS

| Number | Country | Date |
|---|---|---|
| 652,159 | France | of 1929 |